(12) United States Patent
Lee et al.

(10) Patent No.: US 9,737,803 B2
(45) Date of Patent: Aug. 22, 2017

(54) SYSTEM AND METHOD FOR GAMING UTILIZING A MOBILE DEVICE

(75) Inventors: Marion O'Neill Lee, Cordele, GA (US); Jared Brandon Emrich, Cordele, GA (US)

(73) Assignee: SANDBOX SOFTWARE, LLC, Cordele, GA (US)

(*) Notice: Subject to any disclaimer, the term of this patent is extended or adjusted under 35 U.S.C. 154(b) by 0 days.

(21) Appl. No.: 13/198,159

(22) Filed: Aug. 4, 2011

(65) Prior Publication Data
US 2013/0035163 A1 Feb. 7, 2013

(51) Int. Cl.
| | |
|---|---|
| A63F 9/24 | (2006.01) |
| A63F 13/332 | (2014.01) |
| A63F 13/46 | (2014.01) |
| A63F 13/795 | (2014.01) |
| A63F 13/65 | (2014.01) |
| A63F 13/216 | (2014.01) |
| A63F 13/92 | (2014.01) |

(52) U.S. Cl.
CPC .......... *A63F 13/332* (2014.09); *A63F 13/216* (2014.09); *A63F 13/46* (2014.09); *A63F 13/65* (2014.09); *A63F 13/795* (2014.09); *A63F 13/92* (2014.09); *A63F 2300/204* (2013.01); *A63F 2300/556* (2013.01); *A63F 2300/5573* (2013.01)

(58) Field of Classification Search
CPC ... A63F 13/332; A63F 13/46; A63F 2300/204
USPC .................................................... 463/29, 40
See application file for complete search history.

(56) References Cited

U.S. PATENT DOCUMENTS

| | | |
|---|---|---|
| 6,524,189 B1 | 2/2003 | Rautila |
| 6,527,641 B1 | 3/2003 | Sinclair et al. |
| 6,650,892 B1 | 11/2003 | Thiriet |
| 6,756,882 B2 | 6/2004 | Benes et al. |
| 7,088,692 B1 | 8/2006 | Gronroos |
| 7,379,734 B2 | 5/2008 | Sato |
| 7,590,589 B2 | 9/2009 | Hoffberg |
| 8,282,455 B2 * | 10/2012 | Kelly, Jr. ........................... 463/3 |
| 2002/0049074 A1 | 4/2002 | Eisinger et al. |
| 2004/0038708 A1 | 2/2004 | Tsai et al. |
| 2004/0046655 A1 | 3/2004 | Benes et al. |
| 2004/0235568 A1 | 11/2004 | Kim |
| 2005/0054378 A1 | 3/2005 | Sato |
| 2005/0255920 A1 | 11/2005 | Lai et al. |
| 2006/0030408 A1 | 2/2006 | Kiiskinen |
| 2006/0046834 A1 | 3/2006 | Sekine |

(Continued)

*Primary Examiner* — Reginald Renwick
(74) *Attorney, Agent, or Firm* — Baker, Donelson, Bearman, Caldwell & Berkowitz, PC; Dorian Kennedy

(57) ABSTRACT

A method and system (10) is provided for playing an interactive mobile device based game system though a communication network. The communication network includes at least one system central server (13) and database (14) accessible to the internet or other communication networks. The system further includes any number of mobile devices (15), (16) and (17). Each mobile device includes software or a software application for communicating with the system server. In playing the game, users or players accrue points or otherwise advance in the game as they compete or obverse events which occur in real life situations in their geographic location. The events are entered into the central server and verified by communicating requests from the central server to the mobile devices of other players of the game.

13 Claims, 3 Drawing Sheets

(56) References Cited

U.S. PATENT DOCUMENTS

| | | |
|---|---|---|
| 2006/0160623 A1 | 7/2006 | Lee |
| 2006/0167784 A1 | 7/2006 | Hoffberg |
| 2006/0247051 A1 | 11/2006 | Liu et al. |
| 2007/0015580 A1 | 1/2007 | Hunter et al. |
| 2007/0021203 A1 | 1/2007 | Edwards |
| 2007/0042823 A1 | 2/2007 | Shim |
| 2007/0082736 A1 | 4/2007 | Shim |
| 2007/0105627 A1 | 5/2007 | Campbell |
| 2007/0161398 A1 | 7/2007 | Chiu et al. |
| 2007/0167136 A1* | 7/2007 | Groth ........................... 455/41.2 |
| 2007/0172953 A1 | 7/2007 | Shim |
| 2007/0191100 A1 | 8/2007 | Counts |
| 2007/0242088 A1 | 10/2007 | Kim et al. |
| 2007/0265073 A1 | 11/2007 | Novi et al. |
| 2007/0270135 A1 | 11/2007 | Gaschler |
| 2007/0276521 A1* | 11/2007 | Harris ................. G07F 17/3241 700/91 |
| 2007/0289023 A1 | 12/2007 | Bunte et al. |
| 2008/0009349 A1 | 1/2008 | Wolfe |
| 2008/0077520 A1 | 3/2008 | Odeh |
| 2008/0090645 A1* | 4/2008 | Walker ................. G07F 17/3237 463/25 |
| 2008/0146338 A1 | 6/2008 | Bernard et al. |
| 2008/0192058 A1 | 8/2008 | Liu et al. |
| 2009/0002316 A1 | 1/2009 | Rofougaran |
| 2009/0011832 A1 | 1/2009 | Rofougaran |
| 2009/0047982 A1 | 2/2009 | Shi et al. |
| 2009/0081964 A1 | 3/2009 | Buznach |
| 2009/0238405 A1 | 9/2009 | Buznach |
| 2009/0264204 A1 | 10/2009 | Kang et al. |
| 2009/0305789 A1 | 12/2009 | Patil |
| 2010/0004039 A1* | 1/2010 | Kelly et al. ....................... 463/3 |
| 2010/0069136 A1 | 3/2010 | Safaei et al. |
| 2010/0069158 A1 | 3/2010 | Kim |
| 2010/0100446 A1 | 4/2010 | Kim |
| 2010/0223115 A1 | 9/2010 | Chodosh et al. |
| 2010/0287011 A1 | 11/2010 | Muchkaev |
| 2010/0331082 A1 | 12/2010 | Kim et al. |
| 2011/0173587 A1 | 7/2011 | Detwiller |
| 2011/0195763 A1 | 8/2011 | Kang et al. |
| 2011/0195780 A1 | 8/2011 | Lu |
| 2011/0237227 A1* | 9/2011 | Kemery et al. ............ 455/414.1 |
| 2011/0263318 A1 | 10/2011 | Agarwal et al. |

* cited by examiner

SYSTEM AND METHOD FOR GAMING UTILIZING A MOBILE DEVICE

TECHNICAL FIELD

This invention is related to a system for and method of participating in an electronic game with the use of a mobile device wherein the game requires the physical presence of the players.

BACKGROUND OF THE INVENTION

Groups of people are capable of communicating with each other over an electronic network such as the global internet. These communications may include the capability to play different electronic games against one another. These games however are played "virtually" as the users are not physically present together. This virtual playing of games severely limits the in-person socializing and personal interaction.

Accordingly, there is a need for a game and gaming method wherein a person may participate against others in a group while avoiding the isolationism related to virtual game playing. It is to the provision of such therefore that the present invention is primarily directed.

SUMMARY OF THE INVENTION

In a preferred form of the invention, a method for playing a mobile device based game comprises the steps of providing a mobile device having a mobile device game application; observing an event by a first player which has physically occurred at a remote location that enables the first player to advance in a mobile device game application; entering the occurrence of the event into the first player's mobile device utilizing the mobile device game application; transmitting the occurrence of the event from the first player's mobile device to a central server associated with the mobile device game application; verifying the occurrence of the event by sending a message from the central server to a second player's mobile device located at the remote location, and transmitting a verification response from the second player's mobile device to the central server.

In another preferred form of the invention a mobile device based game system comprises a central server, a first mobile device having a mobile device gaming application software, and a second mobile device having a mobile device gaming application software. The first and second mobile devices each have means for entering an observed gaming event into the mobile device as a scoring request, and means for transmitting the entered gaming event scoring request to the central server for processing. The central server has processing means for processing the scoring request from the first mobile device, means for transmitting a verification request from the central server to the second mobile device; means for receiving a response to the verification request from the second mobile device, and means for processing the verification request response from the second mobile device and in response thereto processing a score advancement associated with the observed gaming event scoring request.

DETAILED DESCRIPTION

Figure 1:
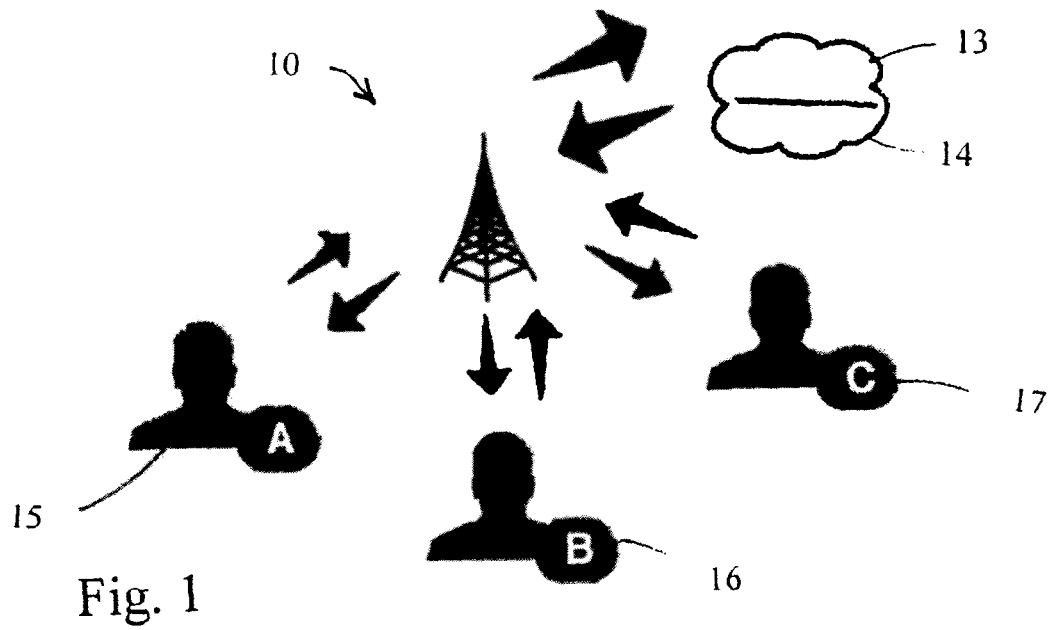
FIG. 1 is a schematic view of the gaming system embodying principles of the invention in a preferred form.

With reference next to the drawings, there is shown a method of playing an interactive mobile device based game system 10 though a communication network. The communication network is a mobile device application (software) for providing a game foundation, communication, verification and scoring. The communication network includes at least one system central server 13 accessible to the Internet or other communication networks. The central server 13 may include any number of databases 14 for user data information, the terms "user", "person" and/or "player" may be used interchangeably herein. The system further includes any number of mobile devices 15, 16 and 17, which may be cellular or mobile telephones, personal data assistant devices ("PDA"), wireless music devices having wireless connectivity, portable computer, or the like. The mobile devices include a display or graphical user interface and Internet accessibility. The mobile devices may also include global positioning system ("GPS") capabilities or other location enabling system, such as AGPS (assisted global positioning system), Enhanced Observed Time Difference ("EOTD") or cell tower triangulation type systems, to enable the system to determine the geographic location of the user.

The communication network also includes a cellular communication network having cell towers 19 located throughout a geographic area. The mobile device may access the internet through the server 13 via the cell towers 19, or alternatively, through any number of know means such as through a Wi-Fi transceiver, or other similar communication receiver transmitter system for accessing the internet.

The game play is coordinated by the system server 13 and database 14. Each mobile device 15, 16 and 17 includes software or a software application for communicating with the system server. The software also receives and transmits user input information. The software may be stored remotely and accessed via the internet. The server 13 keeps track of and stores the scores of each user within the database 14.

The system's mobile device may use, for example, Apple Inc.'s iOS operating system or other easily ported mobile platforms such as Android or Windows Mobile. Additionally, the mobile device may utilize HTTP GET, POST, PUT, and DELETE requests to communicate with the web server and may employ nginx for the web server software. The server code may be written in PHP, and uses MySQL as the database. The mobile device memory requirement is approximately 5.0 mb. HTTP requests may use an open source library ASIHTTPRequest which is written in Objective-C, and includes features like bandwidth throttling, synchronous and asynchronous requests. The data that is included in the HTTP requests and responses is encoded with JSON or javascript object notation. For encoding and decoding JSON in iOS an open source library such as JSONKit may be utilized. Encoding and decoding JSON on the server is handled with the PHP JSON extension.

In playing the game, users or players accrue points or otherwise advance in the game as they compete or obverse events which occur in real life situations in their geographic location, i.e., at least two players are physically present together in a remote location to participate in the gaming conduct. The information may be made available to other players through a community web site hosted by the server 13.

An example of a gaming situation that may be played by users involves a set of rules on how to conduct oneself in the real or physical world in which the user is present. For example, the game may involve a set of rules such as the player must rip the label off the beer bottle from which he/she is drinking, the player must not allow his/her pinky finger to touch a glass from which he/she is drinking, the player must never point with his/her index finger, etc. The observation of a breach or violation of these rules means that an "event" or "scoring event" has occurred which may increase a player's score or otherwise cause a player's advancement in the game should it be physically observed, recorded and verified through the application.

Figure 2:
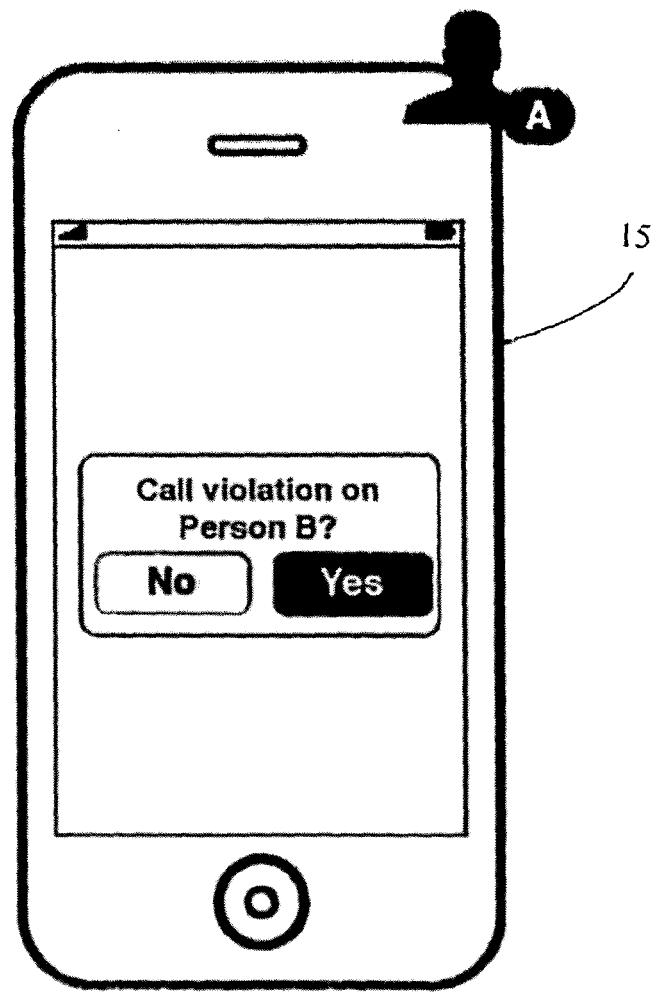
FIGS. 2-6 are a series of schematic views of a mobile telephone of the gaming system of FIG. 1.

For example, while interacting in the real life ("real world") Player A notices that Player B has violated a rule by not ripping the label off the beer bottle from which Player B is drinking. Player A utilizes his mobile device to send or transmit a message with the iOS operating system through the cellular network and through the internet to the server 13 in order to "call" a violation upon Player B. This action is shown graphically at FIG. 2, which shows Player A's mobile device screen entering a violation with the message "Call violation on Person B". Player A enters "yes" and the mobile device relays or transmits the message through the communication network to the server 13.

Figure 3:
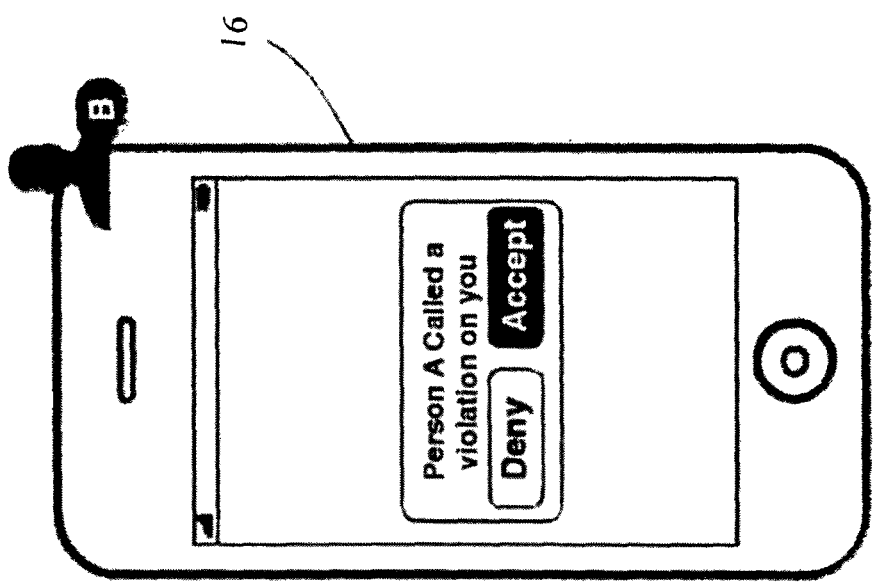

In response to the entry of a violation upon Player B, the server sends a message (transmits) to the mobile device association with Player B in order to validate the infraction, as shown in FIG. 3 with the message "Person A Called a violation on you". Player B must then enter either "Deny" or "Accept", which is then relayed (transmitted) through the communication system back to the server 13.

Figure 4:
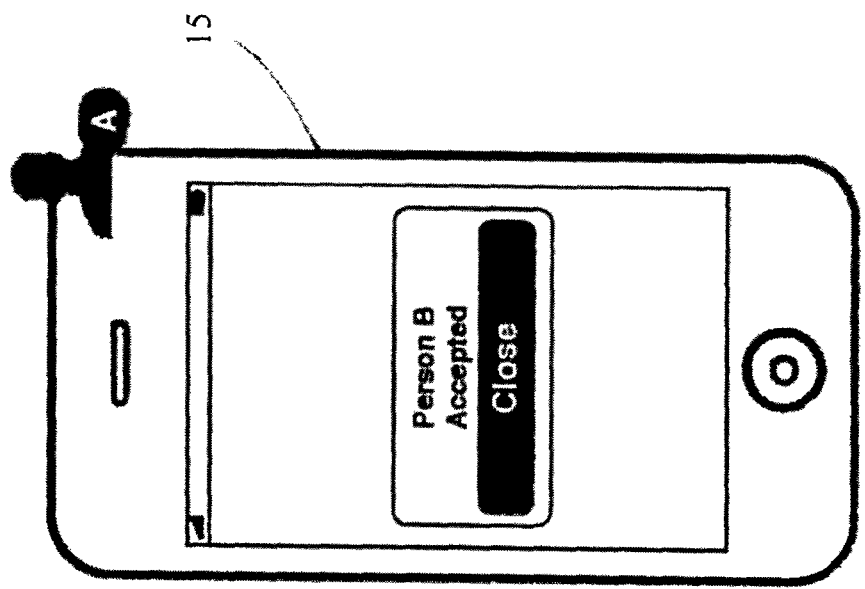
Figure 5:
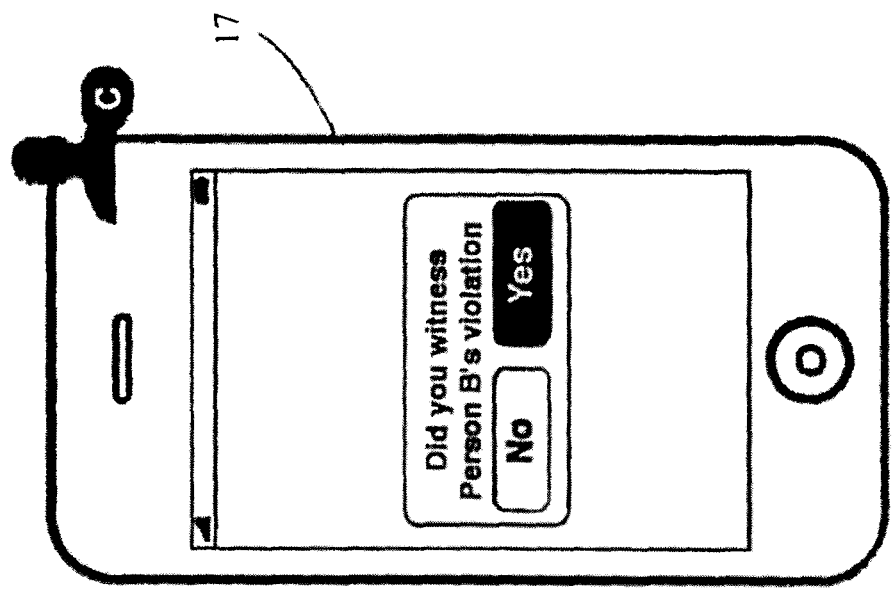

If Player B entered "Accept", Player B confirms or verifies that a violation occurred and the server increases Player A's score by one point and transmits a message "Person B Accepted", as shown in FIG. 4. Alternatively, if Player B enters "Deny" the server locates another user or player in the vicinity of Players A and B through the mobile devices GPS system, or the like, and attempts to confirm or verify the violation through Player C as an independent third party. The server therefore sends a message "Did you witness Person B's violation" to Player C's mobile device, as shown in FIG. 5.

Figure 6:
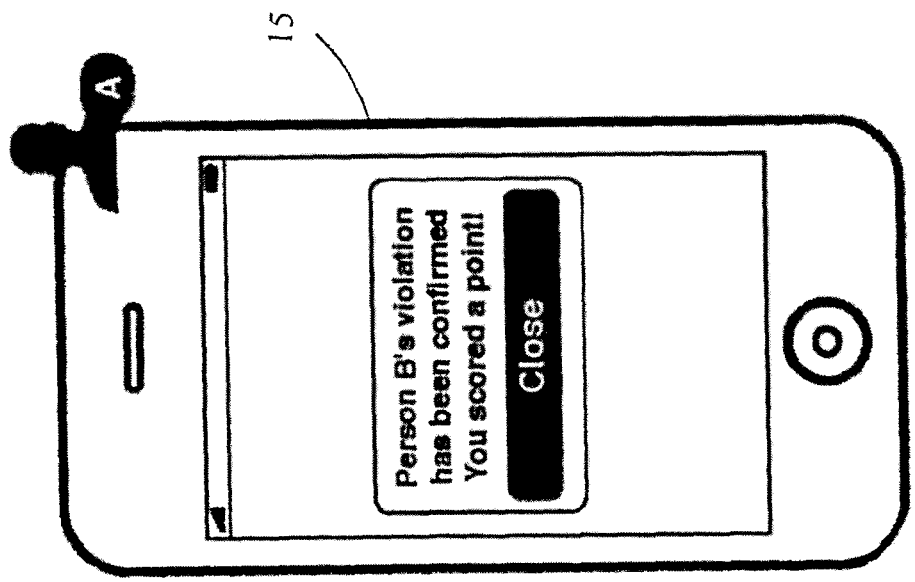

If Player C enters a response of "Yes" the server notifies Player A of the confirmation through the transmission of a message "Person B's violation has been confirmed you score a point", as shown in FIG. 6, and increases Player A's score by one point. The server also notifies Player B that the violation was confirmed by a witness and notifies Player C that the confirmation was recorded and that Player A was granted a point. If Player C enters a response of "No", the system may either search for additional witnesses in the geographic area through another GPS search, or if no such additional witness can be found the server terminate the search and disallow the violation entered by Player A.

As should be understood from the foregoing description, the system allows users to physically interact together in the same geographic area while simultaneously allowing the users to play a game through electronic means.

It should be understood that the just described game illustrates merely one preferred embodiment of a game and that different games or types of games may be played in accordance with the present invention. Such alternative games would include participation of a user to interact with other players in real life while operating a mobile device to implement the game.

It should also be understood that the global positioning or location attribute of the system allows the option of players being able to locate and interact with additional, previously unknown other players. The system may be adapted to alert a player once that player is located within the same general geographic area (example the same bar, restaurant, pub, etc) or within a pre-selected range or distance from another player (example, 30 feet from each other). The alert may download information pertaining to each player to the players so that they are able to recognize each other and thereafter participate in a game together.

The system may also keep track of information related to each player, such as preferred business establishments, preferred beverages of choice, etc. This information may be gathered through the playing of the game or inquiries generated by the central server.

The term central server is intended to represent any central computing device and is not intended to represent only computer servers. The term score is intended to reflect any manner of accounting, displaying, reflecting or otherwise, the status of a player's position, status, score, etc. within a game whether that be through an actual numeric score, position relative to other players, or any other manner of reflecting the status of players within the game.

It thus is seen that a gaming method is now provided which allows electronic playing while players are physically interacting with each other in the real world. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. A method for playing a mobile computer device based game based on a plurality of game related events which relates to the observation of another player's action, comprising the steps of:

providing a first player's mobile computer device having a select mobile device game application;

providing a second player's mobile device having the select mobile computer device game application;

entering the occurrence of each game related event of a plurality of game related events at the time of occurrence of each game related event by a first player which has physically occurred at a remote location which relates to the observation of another player's action that enables the first player to advance in a mobile computer device game application into the first player's mobile computer device utilizing the mobile computer device game application;

transmitting the occurrence of each game related event of the plurality of game related events at the time of occurrence of each game related event which relates to the observation of another player's action from the first player's mobile computer device to a central server associated with the mobile computer device game application;

verifying the occurrence of each game related event of the plurality of game related events by sending a message from the central server to the second player's mobile computer device located at the remote location upon each game related event of the plurality of game related events, transmitting a verification response from the second player's mobile computer device to the central server upon each game related event of the plurality of game related events, changing a score associated with the first player which is stored on the central server in response to the verifying of the occurrence of each game related event.

2. The method of claim 1 wherein the observed game related event of the plurality of game related events is associated with an action taken by the second player.

3. The method of claim 2 further comprising a third player's mobile computer device having a mobile computer device game application, and wherein in response to the second player denying the verification of the game related event of the plurality of game related events the server sends a message to the third player's mobile computer device in the vicinity of the first and second players to verify the occurrence of the game related event.

4. The method of claim 1 wherein the first player mobile computer device and the second player mobile computer device are location detection enabled, wherein said central server can determine if the first and second players are within a general location to enable the first and second players to interact, and wherein the central server can notify the first and second players of each others locations.

5. A method of providing a mobile computer device based game based on a plurality of game related events which relates to the observation of another player's action at the time of occurrence of each game related event, comprising the steps of:

transmitting a request to enter each score enabling game related event of the plurality of game related events from a remote location through the use of a first person's mobile computer device to a central server which relates to the observation of another player's action at the time of occurrence of each game related event;

receiving each transmitted request from the first person's mobile computer device with the central server, and in response transmitting a verification request from the central server to a second person's mobile device upon each of the plurality of game related events which relates to the observation of another player's action at the time of occurrence of each game related event;

receiving the transmitted verification request with the second person's mobile computer device upon the completion of each game related event of the plurality of game related events which relates to the observation of another player's action at the time of occurrence of each game related event and in response transmitting a verification response from the second person's mobile computer device to the central server for each game related event of the plurality of game related events which relates to the observation of another player's action at the time of occurrence of each game related event, and receiving the verification response from the second person's mobile computer device with the central server for each game related event of the plurality of game related events which relates to the observation of another player's action at the time of occurrence of each game related event, and reflecting a change in the first person's game score in response to each affirmative verification response from the second person's mobile device for each game related event of the plurality of game related events which relates to the observation of another player's action at the time of occurrence of each game related event.

6. The method of claim 5 wherein in response to a negative verification response the central server initiates a transmission to a third person for independent verification.

7. The method of claim 6 wherein said third person's mobile computer device receives the third person verification requests, and in response the third person's mobile computer device transmits a verification message to the central server.

8. The method of claim 5 wherein the score enabling game related event of the plurality of game related events is associated with an action taken by the second person.

9. The method of claim 5 wherein the first person's mobile computer device and the second person's mobile computer device are location detection enabled, wherein said central server can determine if the first and second persons are within a general location to enable the first and second persons to interact, and wherein the central server can notify the first and second persons of each others locations.

10. A mobile computer device based game based on a plurality of game related events which relates to the observation of another player's action at the time of occurrence of each game related event comprising, a central server;

a first mobile computer device having a mobile computer device gaming application software;

a second mobile computer device having the mobile computer device gaming application software;

said first and second mobile devices each having means for entering an observed gaming game related event of the plurality of game related events which relates to the observation of another player's action at the time of occurrence of each game related event into said mobile computer device as a scoring request for each game related event of the plurality of game related events which relates to the observation of another player's action at the time of occurrence of each game related event, and means for transmitting said entered gaming game related event scoring request to said central server for processing for each game related event of the plurality of game related events which relates to the observation of another player's action at the time of occurrence of each game related event, and said central server having processing means for processing said scoring request from said first mobile device for each game related event of the plurality of game related events which relates to the observation of another player's action at the time of occurrence of each game related event, means for transmitting a verification request from said central server to said second mobile device for each game related event of the plurality of game related events which relates to the observation of another player's action at the time of occurrence of each came related event; means for receiving a response to said verification request from said second mobile device for each game related event of the plurality of game related events which relates to the observation of another player's action at the time of occurrence of each game related event, and means for processing said verification request response from said second mobile computer device and in response thereto processing a score advancement associated with said observed gaming game related event scoring request for each game related event of the plurality of game related events which relates to the observation of another player's action at the time of occurrence of each game related event.

11. The mobile computer device based game system of claim 10 further comprising a third mobile computer device having a mobile computer device gaming application software, and wherein said central server further comprises means for generating and transmitting a second verification request to a third mobile device for each game related event of the plurality of game related events.

12. The mobile computer device based game system of claim 10 wherein said first and second mobile devices include location detection means, and wherein said central server includes means for determining if the first and second mobile devices are located within the same general geographic area or range from one another.

13. The mobile computer device based game system of claim 12 wherein said central server includes means for generating and transmitting a message to said first and second mobile devices that they are within the same geographic area or range from each other.

\* \* \* \* \*